(12) United States Patent
Murata et al.

(10) Patent No.: US 8,030,416 B2
(45) Date of Patent: Oct. 4, 2011

(54) ORGANIC-INORGANIC HYBRID VITREOUS MATERIAL

(75) Inventors: Noboru Murata, Ube (JP); Chiharu Takimoto, Tsu (JP); Yohei Sato, Matsusaka (JP)

(73) Assignee: Central Glass Company, Limited, Ube-shi (JP)

( * ) Notice: Subject to any disclaimer, the term of this patent is extended or adjusted under 35 U.S.C. 154(b) by 234 days.

(21) Appl. No.: 12/304,689

(22) PCT Filed: Jun. 11, 2007

(86) PCT No.: PCT/JP2007/061742
§ 371 (c)(1),
(2), (4) Date: Dec. 12, 2008

(87) PCT Pub. No.: WO2007/145172
PCT Pub. Date: Dec. 21, 2007

(65) Prior Publication Data
US 2009/0131598 A1    May 21, 2009

(30) Foreign Application Priority Data
Jun. 13, 2006 (JP) .................................. 2006-163178

(51) Int. Cl.
*C08G 63/91* (2006.01)
*C08L 83/02* (2006.01)

(52) U.S. Cl. ........................................ 525/418; 525/474

(58) Field of Classification Search ................... 525/418
See application file for complete search history.

(56) References Cited

U.S. PATENT DOCUMENTS

| | | | |
|---|---|---|---|
| 4,214,057 A * | 7/1980 | Ishihara et al. | 525/100 |
| 5,412,016 A * | 5/1995 | Sharp | 524/430 |
| 5,780,530 A * | 7/1998 | Mizutani et al. | 523/209 |
| 6,448,331 B1 * | 9/2002 | Ioka et al. | 524/859 |
| 6,548,159 B2 * | 4/2003 | Tsai et al. | 428/325 |
| 6,737,145 B1 * | 5/2004 | Watanabe et al. | 428/64.4 |
| 6,946,519 B2 * | 9/2005 | Okubo et al. | 525/54.3 |
| 7,332,196 B2 * | 2/2008 | Kosuge et al. | 427/387 |
| 2003/0134951 A1 * | 7/2003 | Yamaya et al. | 524/265 |
| 2005/0027083 A1 | 2/2005 | Kuniyoshi et al. | |
| 2005/0132748 A1 | 6/2005 | Kuniyoshi et al. | |
| 2005/0158566 A1 * | 7/2005 | Higuchi et al. | 428/447 |
| 2005/0214556 A1 * | 9/2005 | Nishimi et al. | 428/500 |

FOREIGN PATENT DOCUMENTS

| | | |
|---|---|---|
| EP | 1 721 925 A1 | 11/2006 |
| JP | 6-509131 A | 10/1994 |
| JP | 8-501823 A | 2/1996 |
| JP | 11-310720 A | 11/1999 |
| JP | 2002-284975 A | 10/2002 |
| JP | 2003-292795 A | 10/2003 |
| JP | 2005-146222 A | 6/2005 |
| WO | WO 93/01226 A1 | 1/1993 |
| WO | WO 94/07947 A1 | 4/1994 |
| WO | WO 2004/081086 A1 | 9/2004 |
| WO | WO 2005/000943 A1 | 1/2005 |
| WO | WO 2005/082975 A1 | 9/2005 |

OTHER PUBLICATIONS

Machine translation of JP-2003-292795, translation generated Nov. 2010.*
International Search Report dated Sep. 25, 2007 including English translation of the relevant portion (Eight (8) pages).

* cited by examiner

*Primary Examiner* — Robert Loewe
(74) *Attorney, Agent, or Firm* — Crowell & Moring LLP

(57) ABSTRACT

There is provided an organic-inorganic hybrid vitreous material comprising a composite of a polycondensate of an organoalkoxysilane represented by $R^1{}_n Si(OR^2)_{4-n}$ ($R^1$ is an organic group, $R^2$ is a $C_1$-$C_5$ alkyl group, and n is 1-2) and an organic polymer, wherein the polycondensate of the organoalkoxysilane is in 40-70 wt % and the organic polymer is in 30-60 wt % in case that the total weight of the composite is taken as 100 wt %.

8 Claims, No Drawings

ORGANIC-INORGANIC HYBRID VITREOUS MATERIAL

TECHNICAL FIELD

The present invention relates to an organic-inorganic hybrid vitreous material that has characteristics of inorganic glass and plastic as a transparent material and is usable as an alternative of them.

BACKGROUND OF THE INVENTION

Hitherto, inorganic glass has been used as a transparent material. Inorganic glass is superior in transparency, low in water absorption, and very stable. Therefore, it has widely been used as a general-purpose optical material. There has been, however, a problem that it is very heavy as specific gravity is 2.5.

Furthermore, in the case of using inorganic glass, a heating of 350° C. or higher is necessary even in low ones. Thus, there are problems that the forming step becomes complicated and the production cost becomes high, and the like.

To solve these problems, there is proposed an organic-inorganic hybrid vitreous material that is obtained by polycondensation of an organoalkoxysilane, makes a low-temperature forming possible, and is low in water absorption coefficient (see Patent Publication 1).

Patent Publication 1: Japanese Patent Application Publication 2005-146222

SUMMARY OF THE INVENTION

One described, for example, in the above-mentioned Japanese Patent Application Publication 2005-146222 is possible to be formed at a relatively low temperature and is also low in water absorption coefficient at saturation. There is, however, a problem that it is brittle and tends to be broken due to its low physical strength. This is caused by a small number of molecular bonds in the material and can be improved by the preparation conditions. Its properties, however, become close to inorganic glass by increasing the bonds, thereby loosing an advantage of the forming possibility at low temperature.

Thus, there has not yet been obtained a material that has both properties of low water absorption of inorganic glass and forming possibility of plastic at low temperature and has a strength to withstand the normal uses.

According to the present invention, there is provided an organic-inorganic hybrid vitreous material comprising a composite of a polycondensate of an organoalkoxysilane represented by $R^1{}_n Si(OR^2)_{4-n}$ ($R^1$ is an organic group, $R^2$ is a $C_1$-$C_5$ alkyl group, and n is 1-2) and an organic polymer, wherein the polycondensate of the organoalkoxysilane is in 40-70 wt % and the organic polymer is in 30-60 wt % in case that the total weight of the composite is taken as 100 wt %.

The organic polymer may be polyester.

Furthermore, the above organic-inorganic hybrid vitreous material can have 85% or greater in visible light ray transmittance according to JIS R3106 at a thickness of 2 mm.

Furthermore, melting point of the above organic-inorganic hybrid vitreous material is, for example, 50° C. to 200° C.

DETAILED DESCRIPTION

According to the present invention, it is possible to obtain a transparent material that is usable for optical uses and that has both properties of low water absorption of inorganic glass and forming possibility of plastic at low temperature and has a strength to withstand the normal uses.

An organic-inorganic hybrid vitreous material according to the present invention is usable in wide fields of optical materials, such as a field where low-melting glass is used, such as sealing and covering materials of display parts such as PDP, optical information-communication device materials such as optical switch and optical coupler, optical instrument materials such as LED chip, optical functional (nonlinear) optical materials, adhesive materials, and the like; and a field where organic materials such as epoxy are used.

Although the increase of percentage of the polycondensate of the organoalkoxysilane is advantageous to lower water absorption, the resulting organic-inorganic hybrid vitreous material becomes brittle and tends to be broken. Thus, it is desirable that the polycondensate of the organoalkoxysilane is in 70% or lower, and therefore it is desirable that the organic polymer is in 30% or higher. On the contrary, the increase of percentage of the organic polymer results in increase of water absorption. This is not practical. Thus, the organic polymer is desirably 60% or less. Therefore, the polycondensate of the organoalkoxysilane is desirably 40% or greater.

If it is in the outside of this range, other characteristics are the same as those in the case of the singular use, thereby not obtaining the effect of the mixing. Therefore, it is desirably in this range.

It is possible by a method shown in the following to synthesize the polycondensate of the organoalkoxysilane used in the present invention. It is preferably produced by using the organoalkoxysilane as the starting raw material, mixing with suitable amounts of water, catalyst and alcohol, and then going through a heating hydrolysis reaction step, a melting, partial polycondensation step, and a high-temperature polycondensation completion step.

As the catalyst, it is possible to use acetic acid, nitric acid, hydrochloric acid, etc. as acid catalyst, and ammonia as alkali catalyst.

The organoalkoxysilane as the raw material is one that has partially been replaced with organic group, as shown by $R^1{}_n Si(OR^2)_{4-n}$ (in the formula, $R^1$ is an organic group, $R^2$ is a $C_1$-$C_5$ alkyl group, and n is 1-2). It is preferably selected from organoalkoxysilicas having as the organic group aryl group such as phenyl group and naphthyl group, or alkyl group such as methyl group, ethyl group, propyl group (n- and i-), and butyl group (n-, i- and t-), methacryloxy group, vinyl group, glycide group, mercapto group, etc., and having as the alkoxyl group methoxy group, ethoxy group, propoxy group (n- and i-), etc.

Furthermore, of these, it is particularly desirable to contain phenyl group in order to have low melting point and to lower softening point, and to contain mercapto group in order to increase compatibility with the organic polymer.

It is preferable that water used in the mixing step is at least three times by mol the alkoxyl group of the organoalkoxysilane. In conventional sol-gel processes, although it also depends on the type of the alcohol, it has been said to use water at a minimum necessary for hydrolysis. This originates from a basic problem to suppress a rapid hydrolysis and the formation of an unstable sol. Although much water may be used upon forming a sol-gel film in the form of thin film, it is reduced as much as possible in the case of making it into a bulk form. For example, it has been about 2 times by mol the alkoxy group in conventional processes. However, in the case of having an aging step, when water used in the mixing step is less than two times by mol the alkoxy group, there occurs a problem that much time is necessary for the aging step. However, even if the amount of water is too much, much time becomes necessary in the aging step. Therefore, it is more preferably five times to twenty times by mol the alkoxy group. In the mixing step, water, ethanol, acetic acid as catalyst are added to the oxide precursor, followed by mixing with stirring. This order is not important.

As the alcohol, typical ones are methanol, ethanol, 1-propanol, 2-propanol, 1-butanol, 2-methyl-1-propanol, 2-butanol, 1.1-dimethyl-1-ethanol, etc. It is not limited to these.

It is preferable to have a heating reaction step, prior to the melting step, that is, between the mixing step of the starting raw materials and the melting step by heating. This heating reaction step is conducted at a temperature of from 40° C. to 100° C. In the outside of this temperature range, it is not possible to appropriately contain in the structure a unit having an organic functional group R, for example, an organosiloxane represented by $(R_n SiO_{(4-n)/2})$ (n is selected from 1 and 2), and in more detail phenyl siloxane $(Ph_n SiO_{(4-n)/2})$ where the organo group is phenyl group, methylsiloxane $(Me_n SiO_{(4-n)/2})$ where it is methyl group, ethylsiloxane $(Et_n SiO_{(4-n)/2})$ where it is ethyl group, butylsiloxane $(Bt_n SiO_{(4-n)/2})$ (n=1-2) where it is butyl group, etc. Therefore, it becomes extremely difficult to obtain a polycondensate of the organoalkoxysilane that can be melted in the melting step.

This organic functional group R is typically an alkyl group or aryl group. The alkyl group may be of either straight-chain type, branched type, or cyclic type. As the alkyl group, it is possible to cite methyl group, ethyl group, propyl group (n- and i-), butyl group (n-, 1- and t-), etc. Particularly preferable ones are methyl group and ethyl group. Furthermore, as the aryl group, there are phenyl group, pyridyl group, tolyl group, xylyl group, etc. A particularly preferable one is phenyl group. Of course, the organic functional group is not limited to the above-mentioned alkyl group or aryl group.

The upper limit temperature of the heating reaction step is 100° C. or lower in the case of using an alcohol having a boiling point exceeding 100° C., for example, 1-butanol of 118° C., but it is desirable to consider boiling point, too, in alcohols having a boiling point of 100° C. or lower. For example, in the case of using ethanol, there is a tendency to have a good result by setting it at the boiling point of 80° C. or lower. This is supposed to be due to difficulty of achievement of a homogeneous reaction by the amount of alcohol and the change of state since alcohol evaporates abruptly when it exceeds the boiling point.

The melting step by heating is treated at a temperature of from 30° C. to 400° C. At a temperature lower than 30° C., it cannot be melted substantially. If it exceeds 400° C., not only a desired polycondensate cannot be obtained due to combustion of the organic groups that are attached to Si that forms a network, but also there occurs crushing or bubble to become opaque. It is desirably from 100° C. to 300° C.

By going through the melting step and the aging step, it is possible to obtain a stabilized polycondensate. Since the above melting step does not exist in sol-gel processes conducted hitherto, there is naturally none of the subsequent aging step.

In the aging step, it is treated at a temperature of from 30° C. to 400° C. At a temperature lower than 30° C., aging cannot be conducted substantially. If it exceeds 400° C., it may be pyrolyzed, and it becomes difficult to obtain a stable vitreous material. It is desirably from 100° C. to 300° C. Furthermore, when this aging temperature is lower than the melting lower limit temperature, its effect becomes extremely small. It is necessary to have five minutes or longer as the time required for the aging. The aging time depends on the amount of the treatment, the treatment temperature, and the amount of allowable residue of the reaction active hydroxy groups (—OH), but it is generally extremely difficult to reach a satisfactory level with less than five minutes. Productivity is lowered with long time. Therefore, it is desirably from 10 minutes to one week.

In the melting step or aging step by heating, there is a tendency to be able to shorten the time by conducting it under inert atmosphere, under pressure, or under reduced pressure. Furthermore, microwave heating is also effective. Furthermore, it is optional to continuously conduct the heating reaction step, the melting step, and the aging step.

It is necessary for the organic polymer used in the present invention to be a transparent polymer that shows thermoplasticity and contains an aromatic ring, in order to make it homogeneous and transparent in the case of making a complex together with the polycondensate of the organoalkoxysilane.

The reason of the necessity to contain an aromatic ring has not clearly been demonstrated, but it is because we consider that compatibility increases by π-π bond with the aromatic ring to have a tendency to become transparent by containing phenyl group in the polycondensate of the organoalkoxysilane.

Since water absorption coefficient at saturation of the polycondensate by itself of the organoalkoxysilane used in the present invention is as very low as 0.03%, for example, in the case of maintaining water absorption coefficient at saturation at 0.1% or lower, reaction is possible as long as water absorption coefficient at saturation of the organic polymer is 0.14% or lower.

Such organic polymer is, for example, polyester. Since polyester is generally high in light transmittance, it is also desirable in optical uses. Polyester is obtained by a polycondensation between dicarboxylic acid and diol. One usable in the present invention is not particularly limited, as long as it can be mixed with the polycondensate of the organoalkoxysilane after dissolution in solvent, such as polyethylene terephthalate (PET) prepared by using terephthalic acid as the dicarboxylic acid and ethylene glycol as the diol.

For example, as the dicarboxylic acid, it is optional to use 2,6-naphthalenedicarboxylic acid, etc. besides terephthalic acid. Furthermore, as the diol, it is possible to use one having a different chain length, such as 1,3-propanediol and 1,4-butanediol, besides ethylene glycol. In general, there is a tendency that hardness increases with one having a longer chain. A suitable one may be selected depending on use.

Furthermore, as the diol, 9,9-bis[4-(2-hydroxyethoxy)phenyl]fluorene (BHEPF) represented by the following formula,

[Chemical Formula 1]

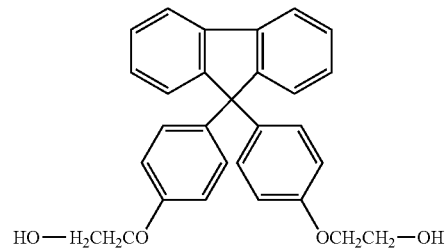

and the like are also desirable. BHEPF is superior in optical characteristics and has an advantage that the polyester to be produced is made to be more soluble in solvent. For example, PET is almost not soluble in tetrahydroxyfuran and chloroform, but one prepared by using BHEPF is soluble in both solvents. This is particularly advantageous in order to dissolve it in solvent and then mix it with the polycondensate of the organoalkoxysilane.

As the diol, it is also possible to use one prepared by mixing together suitable amounts of ethylene glycol and this BHEPF. In this case, the polyester to be obtained will have a structure represented by the following formula.

[Chemical Formula 2]

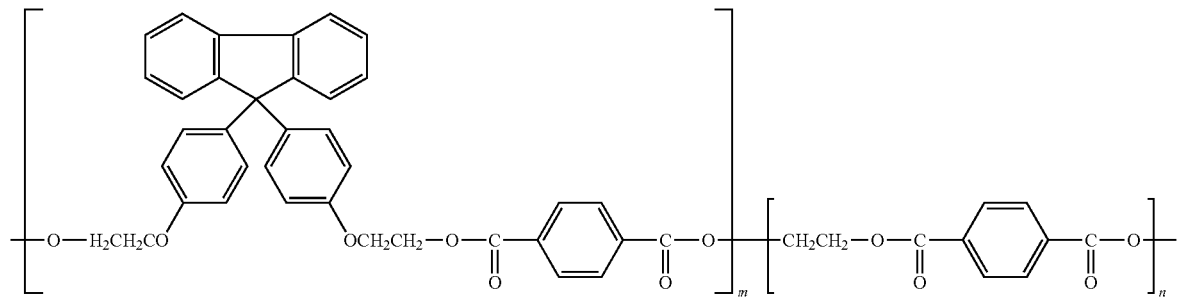

In the above formula, each of m and n represents an arbitrary number.

In this case, ethylene glycol:BHEPF=about 0.2:0.8 to 0.8:0.2 by molar ratio is desirable. By changing the ratio of ethylene glycol to BHEPF, it is possible to suitably change properties of the polyester to be obtained, and it is possible to adjust easiness of the mixing with the polycondensate of the organoalkoxysilane and the properties of the organic-inorganic hybrid vitreous material to be finally obtained. For example, when the amount of BHEPF increases, the polyester becomes easily soluble in solvent, resulting in an easy mixing with the polycondensate of the organoalkoxysilane. Glass transition point, however, increases gradually, resulting in difficulty in shaping of the final product.

To finally obtain an organic-inorganic hybrid vitreous material of the present invention, although it is not particularly limited, there is normally taken a method in which the necessary amounts of the organic polymer and the solvent for dissolution are added, at a stage at which the aging step has been completed in the step for synthesizing the polycondensate of the organoalkoxysilane, to achieve a complete dissolution and a homogeneous dispersion.

It is necessary for the usable solvent to dissolve both of the polycondensate of the organoalkoxysilane and the organic polymer. Tetrahydroxyfuran, xylene, toluene, chloroform, etc. fall under the solvent. In consideration of distilling the solvent off, tetrahydroxyfuran is particularly preferable.

Furthermore, it is also effective to add a titanium complex as a compatibility increasing agent between the polycondensate of the organoalkoxysilane and the organic polymer. As the titanium complex, there are titanium acetylacetonate, titanium tetraacetylacetonate, titanium ethylacetoacetate, titanium octanediolate, etc. Of these, titanium octanediolate is preferable in terms of thermal stability at the heating forming temperature.

The amount of addition is from 0.1 wt % to 0.5 wt %, preferably 0.2-0.4 wt %, relative to a main component that is a combination of the polycondensate of the organoalkoxysilane and the organic polymer. In case that it is less than 0.1 wt %, there is no effect of addition, resulting in no obtainment of a transparent body. If it exceeds 0.5 wt %, it tends to have a color from yellow to brown and tends to become a thermally hardened body.

Thus, it becomes an organic-inorganic hybrid vitreous material by dissolution and homogeneous dispersion and then by heat treatment to distill the solvent off.

Although an organic-inorganic hybrid vitreous material of the present invention is different in melting point depending on the starting material of the polycondensate of the organoalkoxysilane, selection is possible at a suitable time to conform to the target form, such as:

(1) after having a melted condition at a temperature that is melting point or higher, it is poured into a mold having a predetermined shape to have a final molded body;

(2) after a melting molding in the form of precursor, it is pressed at a temperature that is softening temperature or higher into a final molded body; and (3) a solidified material by cooling is turned into a final molded body by grinding.

The molded body formed by the above-mentioned method is used for uses in which various properties such as transparency, low water absorption, etc. are directly applied.

EXAMPLE 1

In the following, it is explained by examples.

As the organoalkoxysilanes, diphenyldiethoxysilane and mercaptopropyltrimethoxysilane were used. As the mixing step, 25 g of diphenyldiethoxysilane and 1.5 g of mercaptopropyltrimethoxysilane were added dropwise with stirring into a mixed solution of 90 g of water, 92 g of ethanol, 0.6 g of acetic acid as catalyst. As the reaction step, it was hydrolyzed by heating at 60° C. for 3 hours. Then, it was increased to 150° C., and a partial polycondensation was conducted by heating for 5 hours while it was melted. Then, a transparent polycondensate was obtained by cooling to ordinary temperature.

As a copolymer formed of terephthalic acid, ethylene glycol and BHEPF, a polyester was synthesized by mixing in a manner that the molar ratio of ethylene glycol to BHEPF becomes 6:4.

50 g of this polyester was blended in relative to 50 g of the above-synthesized polycondensate, followed by dissolution in 300 g of tetrahydrofuran as the solvent and stirring at ordinary temperature until complete dissolution. Then, there was added 0.2 g of titanium octanediolate as the titanium complex, followed by distilling the solvent off at 150° C., thereby obtaining an organic-inorganic hybrid vitreous material.

This organic-inorganic hybrid vitreous material in a predetermined amount was added into a silicone mold. Then, melting was conducted by maintaining it for 90 minutes under reduced pressure in an atmosphere of 245° C. by using a vacuum oven. With this, it became possible to make it conform to the mold shape. Then, it was cooled to ordinary temperature, thereby preparing a circular specimen having a diameter of 18 mm and a thickness of 2 mm.

This specimen was subjected to a visible light transmittance measurement based on JIS R3106 by using a spectrophotometer U-4000 made by NIPPON DENSHOKU. As softening temperature, deflection temperature was measured under a load of 1 g by using a thermal expansion measuring apparatus TMA8310 made by RIGAKU. As hardness, a spring loaded value was measured based on JIS K 6253 by using a durometer (a spring-type durometer) Type D of GS-702G made by TECLOCK.

The measurement results are shown in Table 1.

EXAMPLE 2

A specimen was prepared, and evaluation was conducted by the same operation as that of Example 1, except in that the polycondensate of the organoalkoxysilane prepared by Example 1 was made to be 70 g and that the fluorene-containing polyester was made to be 30 g.

EXAMPLE 3

A specimen was prepared, and evaluation was conducted by the same operation as that of Example 1, except in that the polycondensate of the organoalkoxysilane prepared by Example 1 was made to be 40 g and that the fluorene-containing polyester was made to be 60 g.

EXAMPLE 4

A specimen was prepared, and evaluation was conducted by the same operation as that of Example 1, except in that in Example 1 the mercaptopropyltrimethoxysilane was made to be 2.5 mol %, and the titanium complex was made to be 0.5 wt %.

EXAMPLE 5

A specimen similar to that of Example 1 was prepared, and evaluation was conducted by the same operation as that of Example 1, except in that in Example 1 the mercaptopropyltrimethoxysilane was made to be 12.5 mol %, and the titanium complex was made to be 0.1 wt %.

COMPARATIVE EXAMPLE 1

A specimen was prepared, and evaluation was conducted by the same operation as that of Example 1, except in that only the polycondensate of the organoalkoxysilane, which had been synthesized in Example 1, was used. As a result, it was broken into small pieces.

TABLE 1

|  | Visible Light Transmittance (%) | Softening Temp. (° C.) | Hardness |
| --- | --- | --- | --- |
| Example 1 | 87 | 138 | 52 |
| Example 2 | 85 | 135 | 36 |
| Example 3 | 88 | 139 | 60 |
| Example 4 | 87 | 145 | 48 |
| Example 5 | 85 | 132 | 43 |
| Com. Ex. 1 | 90 | 120 | (Break) |

(Results)

As understood from Table 1, those of Examples of the present invention were 85% or greater in visible light transmittance and 100-200° C. in softening temperature and were ones sufficiently capable of being applied to optical materials from the viewpoint of hardness, too. In contrast with this, one of Comparative Example had a problem such as low hardness.

The invention claimed is:

1. A method for producing an organic-inorganic hybrid vitreous material comprising a composite of a polycondensate of an organoalkoxysilane and an organic polymer, the method comprising the steps of:

(a) dissolving the polycondensate of the organoalkoxysilane represented by $R^1{}_n Si(OR^2)_{4-n}$, where $R^1$ is an organic group, $R^2$ is a $C_1$-$C_5$ alkyl group, and n is 1-2, and the organic polymer in a solvent to prepare a solution;

(b) adding a titanium complex, as a compatibility increasing agent for the polycondensate of the organoalkoxysilane and the organic polymer, to the solution; and (c) distilling the solvent out of the solution such that the polycondensate of the organoalkoxysilane is 40-70 wt % and the organic polymer is 30-60 wt %, based on the total weight of the composite.

2. A production method according to claim 1, wherein the organic polymer of claim 1 is a polyester.

3. A production method according to claim 1, wherein the organic group $R^1$ of claim 1 comprises a phenyl group.

4. A production method according to claim 1, wherein the organic group $R^1$ of claim 1 comprises a mercapto group.

5. A production method according to claim 1, wherein the polycondensate of the organoalkoxysilane of claim 1 is obtained by a method comprising a step of mixing together the organoalkoxysilane, water, catalyst and alcohol; a heating reaction step; a melting step; and an aging step.

6. A production method according to claim 5, wherein the heating reaction step is conducted at a temperature of 40-100° C., and each of the melting step and the aging step is independently conducted at a temperature of 100-300° C.

7. A method for producing an organic-inorganic hybrid vitreous material comprising a composite of a polycondensate of an organoalkoxysilane and an organic polymer, the method comprising the steps of:

(a) dissolving the polycondensate of the organoalkoxysilane represented by $R^1{}_n Si(OR^2)_{4-n}$, where $R^1$ is an organic group, $R^2$ is a $C_1$-$C_5$ alkyl group, and n is 1-2, and the organic polymer in a solvent to prepare a solution;

(b) adding a titanium complex, as a compatibility increasing agent for the polycondensate of the organoalkoxysilane and the organic polymer, to the solution; and (c) distilling the solvent out of the solution such that the polycondensate of the organoalkoxysilane is 40-70 wt % and the organic polymer is 30-60 wt %, based on the total weight of the composite, wherein the titanium complex is titanium octanediolate.

8. A method for producing an organic-inorganic hybrid vitreous material comprising a composite of a polycondensate of an organoalkoxysilane and an organic polymer, the method comprising the steps of:

dissolving the polycondensate of the organoalkoxysilane represented by $R^1{}_n Si(OR^2)_{4-n}$, where $R^1$ is an organic group, $R^2$ is a $C_1$-$C_5$ alkyl group, and n is 1-2, and the organic polymer in a solvent to prepare a solution; and distilling the solvent out of the solution such that the polycondensate of the organoalkoxysilane is 40-70 wt % and the organic polymer is 30-60 wt %, based on the total weight of the composite, wherein the organic polymer is a polyester obtained by a polycondensation between a dicarboxylic acid and a diol, and wherein the diol is 9,9-bis[4-(2-hydroxyethoxy)phenyl]fluorene represented by the following formula:

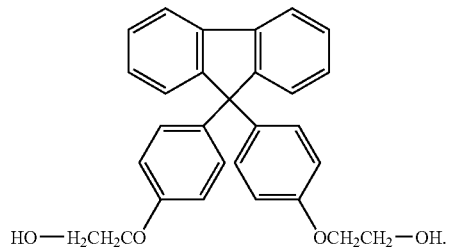

* * * * *